United States Patent
Wohlgenannt (10) Patent No.: US 10,124,938 B2
(45) Date of Patent: Nov. 13, 2018

(54) POURING CLOSURE FOR THE NECK OF A CANISTER OR ANY CONTAINER FOR CONTROLLED MULTI-SIDED POURING

(71) Applicant: CAPARTIS AG, Schaffhausen (CH)

(72) Inventor: Herbert Wohlgenannt, Schaffhausen (CH)

(73) Assignee: CAPARTIS AG, Schaffhausen (CH)

( * ) Notice: Subject to any disclaimer, the term of this patent is extended or adjusted under 35 U.S.C. 154(b) by 0 days.

(21) Appl. No.: 15/323,519

(22) PCT Filed: Jun. 18, 2015

(86) PCT No.: PCT/EP2015/063702
§ 371 (c)(1),
(2) Date: Jan. 3, 2017

(87) PCT Pub. No.: WO2016/000975
PCT Pub. Date: Jan. 7, 2016

(65) Prior Publication Data
US 2017/0144811 A1    May 25, 2017

(30) Foreign Application Priority Data

Jul. 3, 2014 (CH) ...................................... 1013/14

(51) Int. Cl.
*B67D 3/00* (2006.01)
*B67D 7/06* (2010.01)
(Continued)

(52) U.S. Cl.
CPC ........... *B65D 47/263* (2013.01); *B65D 41/04* (2013.01); *B65D 47/32* (2013.01); *B65D 47/36* (2013.01);
(Continued)

(58) Field of Classification Search
CPC ...... B65D 47/263; B65D 47/32; B65D 41/04; F16N 37/00
(Continued)

(56) References Cited

U.S. PATENT DOCUMENTS 5,303,850 A * 4/1994 Connan ................ B65D 47/263
215/253
5,785,213 A * 7/1998 Guillot ................ B65D 47/263
215/250

(Continued)

*Primary Examiner* — Vishal Pancholi
(74) *Attorney, Agent, or Firm* — Steven M. Shape; Dennemeyer & Associates, LLC (57) ABSTRACT

This pouring closure permits controlled multi-side pouring by means of a canister spout. The pouring closure consists of a spout attachment (2), which forms a channel (14), which is reduced in size with respect to the spout and an upper outer edge of which forms a protruding drop lip (11). A closure cover (1), which acts as a jet former, forms a pipe (4), which extends downward and which fits into a channel (14) on the spout attachment (2) in a sealing manner. The pipe (4) extending downward has a lateral window (5), which extends at least around 90° of the pipe circumference. The remaining pipe circumference is doubled-walled. The interior thus formed leads toward the outside in the axial direction at the lower end of the pipe (4) as an air channel (7), and the air channel (7) likewise leads toward the outside only in the upper region of the window (5) laterally on both sides of the window. Thus, pouring can occur over each point of the drop lip (11) with a jet that always remains constant and with sufficient pressure equalization in the canister during the entire pouring process.

12 Claims, 8 Drawing Sheets

(51) Int. Cl.
    *B65D 47/26*     (2006.01)
    *B65D 47/32*     (2006.01)
    *F16N 3/04*     (2006.01)
    *F16N 37/00*     (2006.01)
    *B65D 41/04*     (2006.01)
    *B65D 47/36*     (2006.01)

(52) U.S. Cl.
    CPC ............... *F16N 3/04* (2013.01); *F16N 37/00* (2013.01); *F16N 2037/006* (2013.01)

(58) Field of Classification Search
    USPC ....... 222/519, 520, 544, 553, 562, 564, 549, 222/550, 560
    See application file for complete search history.

(56) References Cited

U.S. PATENT DOCUMENTS

| | | | | |
|---|---|---|---|---|
| 5,839,611 | A * | 11/1998 | Obadia | B65D 41/3452 222/153.14 |
| 2005/0127102 | A1 * | 6/2005 | Nusbaum | B65D 47/263 222/153.06 |
| 2005/0127105 | A1 * | 6/2005 | Kay | B05B 9/042 222/211 |
| 2008/0210709 | A1 * | 9/2008 | Wohlgenannt | B65D 47/263 222/111 |
| 2008/0277613 | A1 * | 11/2008 | Ramsey | B65D 47/263 251/309 |

\* cited by examiner

POURING CLOSURE FOR THE NECK OF A CANISTER OR ANY CONTAINER FOR CONTROLLED MULTI-SIDED POURING

The invention relates to a pouring closure for the neck of a canister or any container, wherein this pouring closure is a special facility for controlled pouring of contents from a canister or container forwards and sideways, i.e. up to about 90° from the two sides facing away from the pouring neck. The contents may be a liquid, aqueous to viscous oily, or else a free-flowing bulk material such as salt or the like.

A canister, particularly an oil canister, is usually a container of cubic shape. Engine oil canisters are usually used in the form of plastic containers and these cubic containers are usually beveled at the top, so that they comprise an upper surface that is obliquely inclined. The canister neck is arranged at the highest point, wherein its cover has its axis of rotation perpendicular to the horizontal support. This design facilitates pouring oil into an oil filler neck on an engine. In most cases, oil filler necks are arranged approximately flush with other engine parts on the engine, so that the filling hole is surrounded by a surface at approximately the same height. However, this makes it impossible to place the canister neck directly close to the filling hole, which is why the filling neck on the engine has to receive the pouring jet from a certain height, and thus the jet initially flows freely into the filler neck over almost one canister height. The upper side of the oil canister is beveled in order to be able to incline it with its pouring neck against the filling neck before oil flows out. Without this bevel, oil would leak out of the canister neck as soon as the canister was tilted, and the jet could not smoothly detach from the neck. Spilling oil over the engine or engine compartment would thus become inevitable. On the other hand, the bevel allows the canister to be inclined via its narrow side by approximately 30° to 40° before the liquid is able to exit. However, the advantage achieved with this design of the oil canister can not overcome the difficulty of the filling process. A filled oil canister typically contains 1 to 5 liters of oil and thus weighs as many kilos. In practice, such a weight is an additional obstacle to the controlling, guiding and maintaining of the pouring process. One remedy is to have the neck at the wide side of the oil canister rather than at its narrow side, although it is not intended for this purpose. If the oil canister is inclined via its wide side, the filler neck may also be hit by the jet at the beginning of the pouring, and is often not successful, even though the pouring neck may then be brought closer to the filler neck.

A further disadvantage when pouring with such an oil canister via an open canister neck is that, if the canister is inclined too steeply, the oil jet takes up the entire cross-section of the pouring neck, and the air for venting the canister can then only flow intermittently into the canister, with the result that the oil jet becomes irregularly powerful because successive surges are generated. As a result, the oil jet slops over or sways back and forth over a certain area. This often causes spillage of oil next to the filler neck. A further disadvantage of the conventional pouring neck is that interruption of the pouring usually leaves a droplet at the edge of the container neck, which may drip outwards or run downwards over the outside of the container neck, wherein oil finally runs over the outside of the container so that the hands become soiled.

The object of the present invention is therefore to provide a pouring closure for the neck of a canister or any container for the controlled multi-sided or isotropic pouring of the contents of a canister or container which eliminates all of the above-mentioned disadvantages. The pouring of a controlled jet is to be ensured with this device. Controlled pouring requires that the jet emerges at a constant rate, and any occurrence of swaying or sloshing is effectively avoided by ensuring a continuous supply of air into the canister or container, wherein the outflowing volume of liquid is equivalent to the quantity of the incoming air in order to equalize and maintain the internal pressure of the canister or container. In addition, the pouring of such a uniform jet via any desired side of the front circumferential half of the pouring neck is to be made possible, and finally the pouring should be able to be terminated at any time without dripping.

This object is achieved by a pouring closure for the neck of a canister or any container for controlled multi-side pouring, which is characterized by the features of claim 1.

In the figures, an advantageous embodiment of this pouring closure is shown in various drawings as an example. The pouring closure is described below and its function is explained with reference to these figures.

Figure 1:
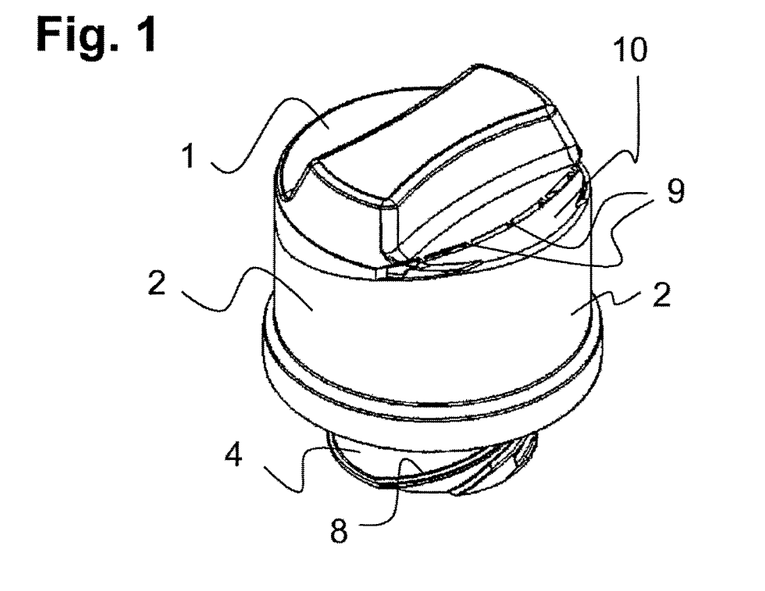
FIG. 1 shows the assembled closed state with the pouring closure in the closed state.
Figure 2:
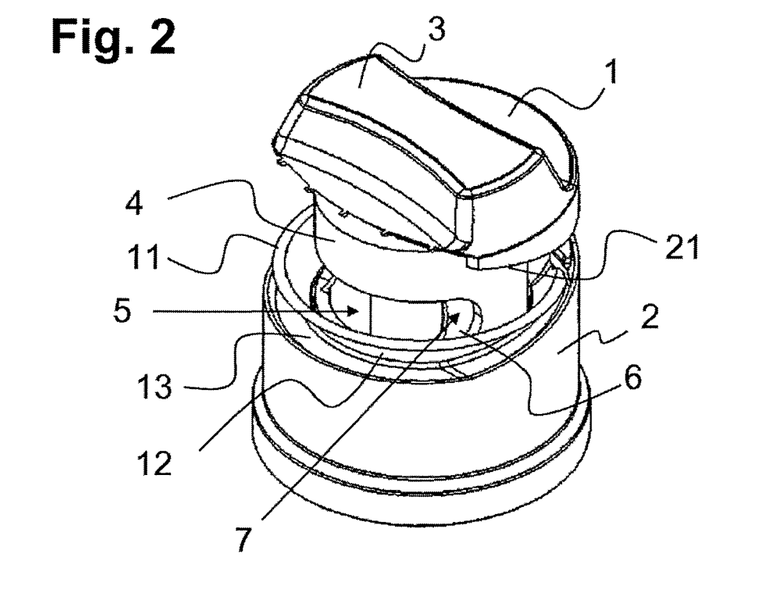
FIG. 2 shows the assembled pouring closure in the open state.

FIG. 1 shows the pouring closure in the assembled, closed state, as it is placed on the neck of a container or canister. The closure consists of two molded parts, a closure cap 1 and a neck attachment 2 underneath, which is placed on the neck of a canister to be fitted and may be placed on any suitable container neck in the same way. FIG. 2 shows the pouring closure in the open state. For opening in the example shown, the closure cap 1 is turned counter-clockwise as viewed from above, wherein it is moved upwards by means of the steep threaded connection with the neck attachment 2. As a result, the outflow channel is released as well as the ventilation channel for the simultaneous venting of the interior of the canister, as will become clear in the following description with reference to further figures. A grip 3 is formed on the upper side to turn the closure cap 1. A tube 4 extends downwards on the closure cap 1, wherein this tube 4 comprises a window 5 which is cut out of approximately 180° of the circumference of the tube 4. A further inner wall 6 is integrated on the inner side of this tube 4 so that the tube is double-walled in the rear region. The region between the tube wall and the inner wall 6 serves as a ventilation channel, as will be described in detail. The tube 4 extends downwards and sealingly into a tube, which is formed in the interior of the neck attachment 2. The tube 4 may be seen protruding from the neck attachment 2 at the bottom in FIG. 1, i.e. in the closed state of the pouring closure. The steep thread 8 on the outer wall of this tube 4 may also be seen here. Some thin material bridges 9 may also seen as defined breaking points on the closure cover 1 in FIG. 1. When the pouring cap is opened for the first time by rotating the closure cap 1 on the neck attachment 2, these material bridges 9 are broken and the closure cap 1 may be rotated further in the opening direction. An initial tamper-proof facility is thus formed here. The approximately half-moon-shaped plate 10 on the other side of the material bridges 9 is part of the neck attachment 2 and always remains connected to or with it. FIG. 2 also shows the drip lip 11 at the lower outer edge 21 on the closure cap 1. The drip lip 11 is formed by a sharp projection, below which the neck attachment 2 is tapered a little through a wall leading obliquely downwards, while a shoulder 13 is formed at the lower end of the taper 12.

Figure 3:
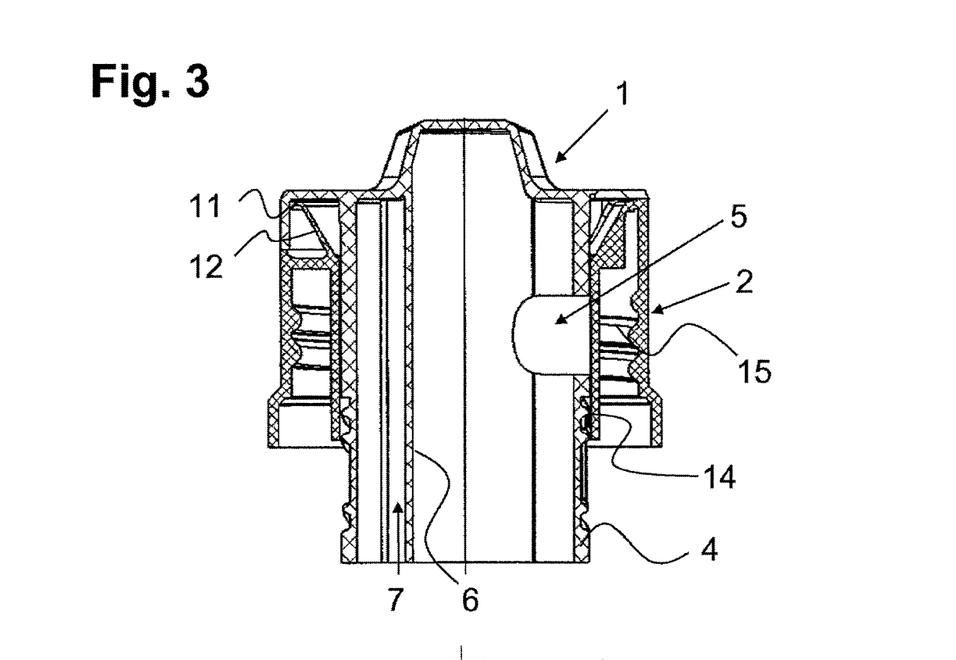
FIG. 3 shows the assembled pouring closure in the closed state in a section along its axis of rotation.

The structure of the entire pouring closure may be seen from the sectional drawing according to FIG. 3. This shows the assembled pouring closure in the closed state in a section along its axis of rotation. The parts with fine cross-hatching are part of the neck attachment 2, while those parts with the coarser cross-hatching belong to the closure cap 1. The closure cap 1 is inserted into the neck attachment 2. The neck attachment 2 forms in its interior a tube such as a channel 14 of somewhat smaller diameter than the outer diameter of the neck attachment 2. The tube 4 of the closure cover 1 engages sealingly in this tube or channel 14. In the closed state of the closure cap, its window lies here opposite the inner wall of the tube/channel 14 at the neck attachment 2. The window 5 is thus sealed as the tube 4 is sealingly engaged in the tube/channel 14. The window 5 is thus sealed in the tube/channel 14, in the closed state of the pouring-out closure, against the inner wall of the tube/channel 14. The inner tube 4 on the closure cap 1 is double-walled by a further inner wall 6 an both sides of the window 5 on the opposite side of the latter, wherein an intermediate space is formed between the outer side of this wall 6 and the inner side of the tube 4 to form a ventilation channel 7, wherein this ventilation channel thus surrounds approximately 180° of the interior of the tube 4. An axially-extending ventilation channel may also be formed on the inner wall as an alternative to a double-walled design of the tube 4, for example in the form of a shaped semicircular channel or U-shaped profile opposite the center of the drip lip 11 and the two sides of the window 5. These ventilation channels are then likewise open at the bottom at the end of the tube 4, as well as at the top on both sides and above the window 4.

Figure 4:
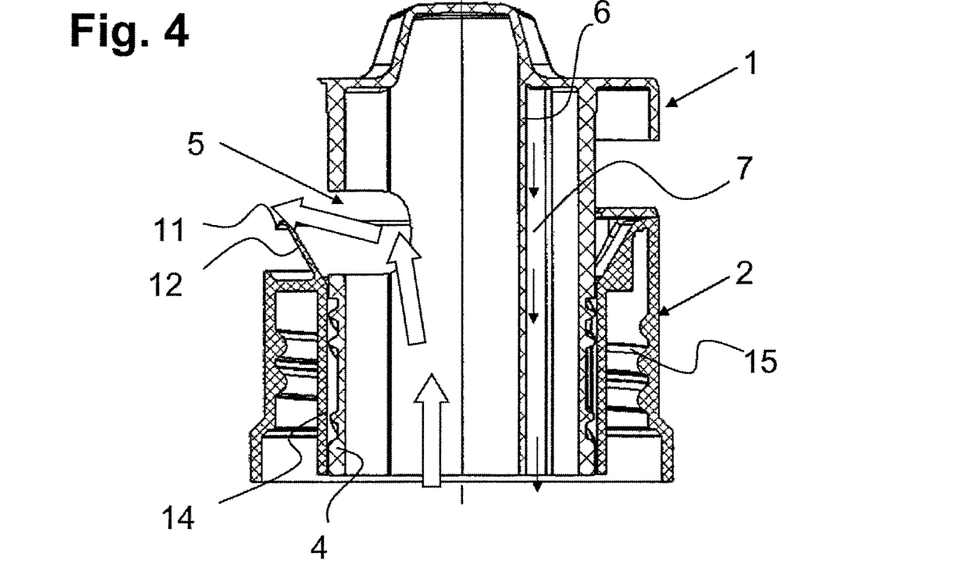
FIG. 4 shows the assembled pouring closure in the open state in a section along its axis of rotation.

FIG. 4 shows the assembled pouring closure in the open state in a section along its axis of rotation. Compared to FIG. 3, the closure cap 1 has now been rotated through 180° in the counter-clockwise direction. Due to the steep thread 8 on the outer wall of the tube 4, the closure cap 1 has thus been screwed upwards out of the neck attachment 2. The window 5 has therefore been rotated through 180° and is now located on the left side of the illustration in FIG. 4, and is positioned above the upper edge of the inner tube 14 on the neck attachment 2 in this position. As a result, the outflow channel is released, wherein liquid or also free-flowing bulk material may emerge from underneath along the indicated wide arrows through the window 5 when the canister is inclined and the pouring closure is in a pouring position. Effectively, as liquid is poured out or solid material flows out, air flows from the outside through the ventilation channel 7 into the interior of the canister, as shown in FIG. 4 through the thin arrows. The closure cap 1 initially acts as a closure, wherein this closure cap 1 forms this downwardly-extending tube 4, which fits sealingly into the channel or the tube 14 on the neck attachment 2 and closes the pouring closure sealingly when the closure cap 1 is lowered onto the neck attachment 2. In the open state, the closure cap 1 acts as a jet former, wherein its downwardly-extending tube 4 comprises the lateral window 5 which extends around at least 90° of the circumference of the tube, while the remaining tube circumference is double-walled, wherein the tube 4 forms this further tube wall 6 in its interior. The intermediate space between the two tube walls and thus the ventilation channel 7 formed therein, opens out in the axial direction at the lower end of the tube 4, and also opens outwards on both sides of the window in the upper region of the window 5. The action of this ventilation channel 7 during pouring and the effect thus produced is described in more detail with reference to FIG. 11.

Figure 5:
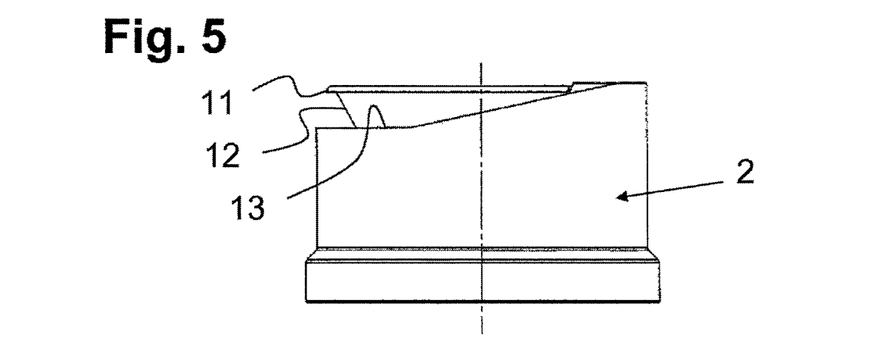
FIG. 5 shows the neck attachment viewed from the side.

First, FIG. 5 shows the neck attachment 2 viewed from the side. The design of the drip lip 11, as well as the wall 12 tapering by about 2 to 5 mm, may be seen here, wherein a shoulder 13 is formed below the drip lip 1. The entire cut-away area on the upper side of the neck attachment 2 is filled by the screwed-on closure cap 1, which then rests with its lower edge 21 fully on the shoulder 13 when the pouring closure is closed.

Figure 6:
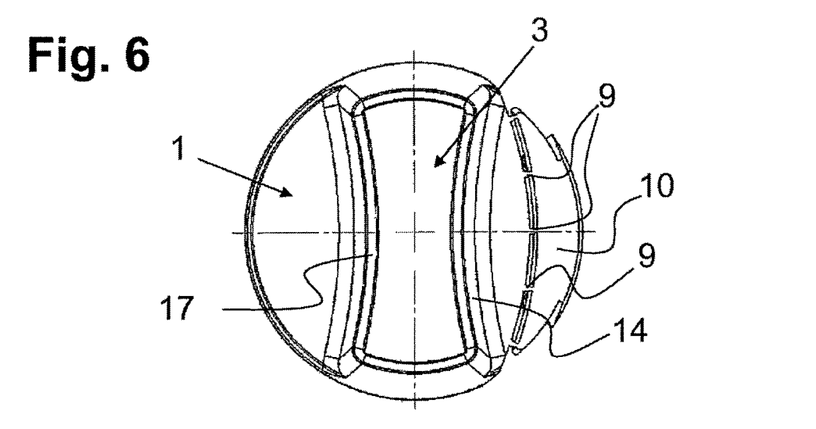
FIG. 6 shows the closure cap viewed from above.

FIG. 6 shows the closure cap 1 viewed from above. The diametrically-arranged grip 3 may be seen with its two opposing, slightly cambered gripping surfaces 17, by means of which the grip 3 may be gripped between the thumb and the curved index finger and subsequently rotated. The first opening of the closure or the first rotation of the closure cap 1 with the pouring closure still closed may only be effected by breaking the material bridges 9, wherein the closure cap 1 turns upwards away from the plate 10 belonging to the neck attachment 2.

Figure 7:
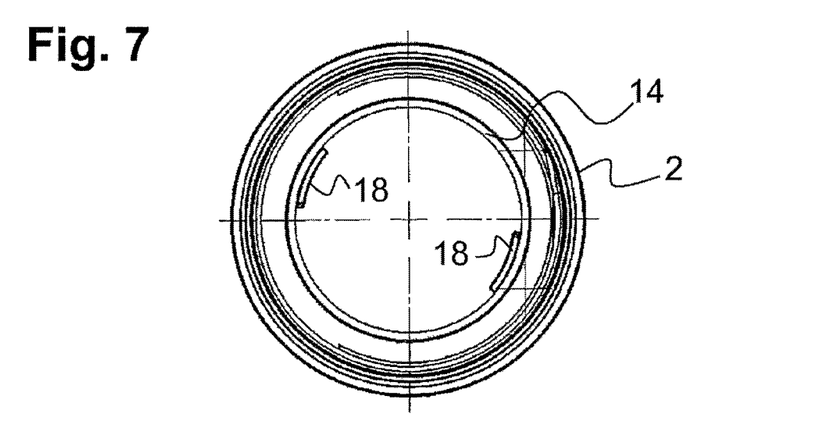
FIG. 7 shows the neck attachment viewed from below.

FIG. 7 shows the neck attachment 2 in a view from below. Two threaded guides 18 may be seen here on the inner wall of the tube 14, on which the steep thread 8 is guided on the outer wall of the tube 4 on the closure cap 1.

Figure 8:
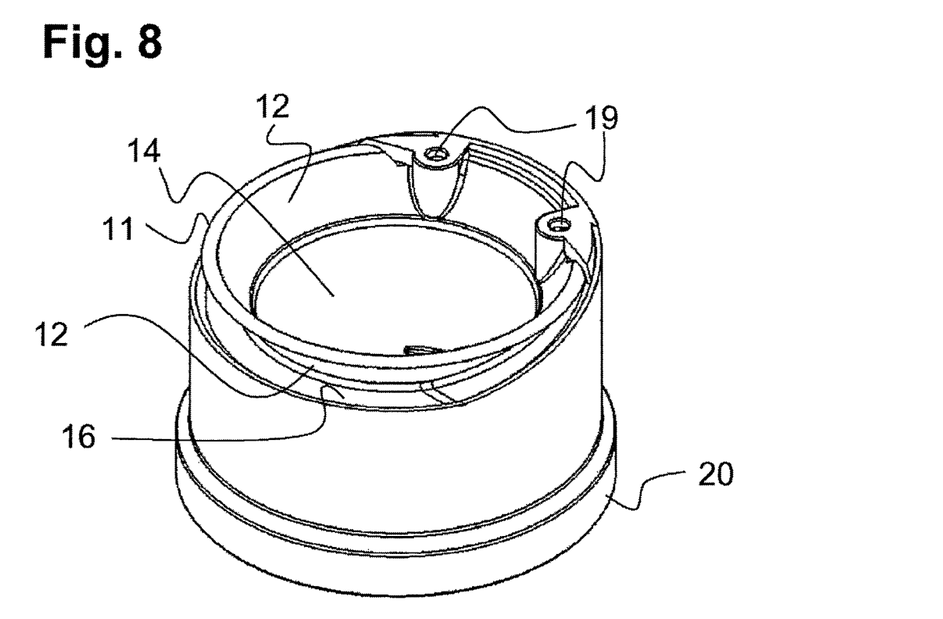
FIG. 8 shows the neck attachment viewed obliquely from above.

FIG. 8 shows the separate neck attachment 2 obliquely from above. The inserted tube 14 and one of the threaded guides 18 may be seen in this view. Furthermore, the drip lip 11 is shown with the downwardly-oriented taper 12, wherein a shoulder 16 is formed below the taper 12. An area with two bushes 19 lies diametrically opposite the drip lip 11. Clamping cones, which are mounted on the underside of the plate 10, may engage these bushes. They are used during the assembly of the closure cap. The closure cap 1 is screwed into the neck attachment 2 for this mounting. Finally, the plate 10 for the initial tamper-proof facility, which is connected to the closure cap 1 via the material bridges 9, is firmly and non-detachably connected in these bushes 19 by means of its clamping cone, so that the plate 10 remains firmly connected to the neck attachment 2 even in the event of the material bridges 9 being broken.

Figure 9:
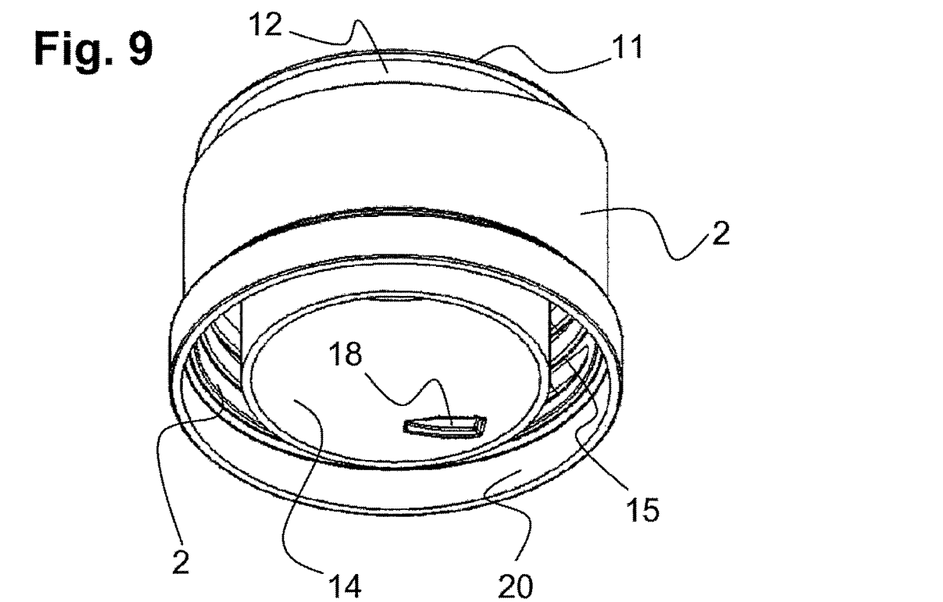
FIG. 9 shows the neck attachment viewed obliquely from below.

FIG. 9 shows the neck attachment 2 as viewed obliquely from below. In this illustration, the threaded guides 18 may be seen on the inner wall of the tube 14. A thread 15 is formed on the inner wall of the neck attachment 2, by means of which the neck attachment in this example may be screwed onto a threaded neck of a canister or container. A security band 20 extends along the lower edge and is screwed onto the threaded neck of the canister via a bead on the threaded connection, and subsequently engages thereon, so that the neck attachment 2 may no longer be unscrewed from the threaded neck.

Figure 10:
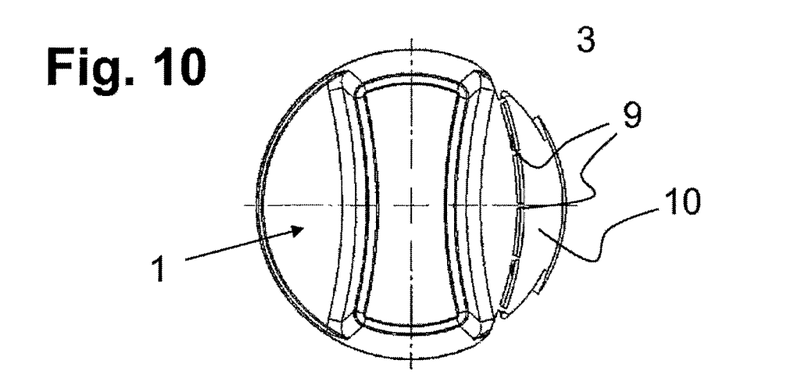
FIG. 10 shows the closure cover viewed from above, with an intact initial tamper-proof facility.
Figure 11:
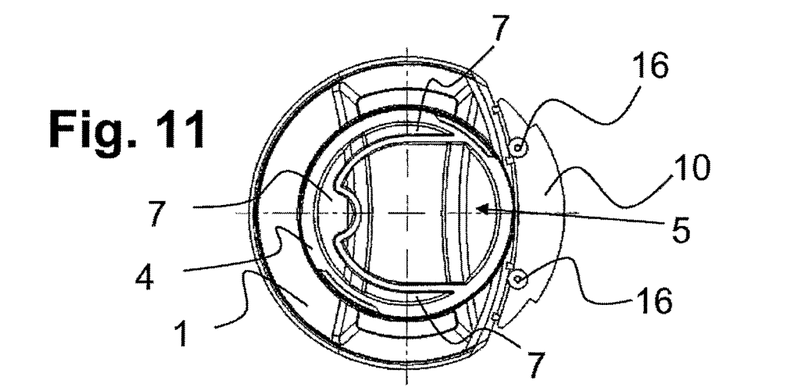
FIG. 11 shows the closure lid viewed from below, with an intact initial tamper-proof facility.
Figure 12:
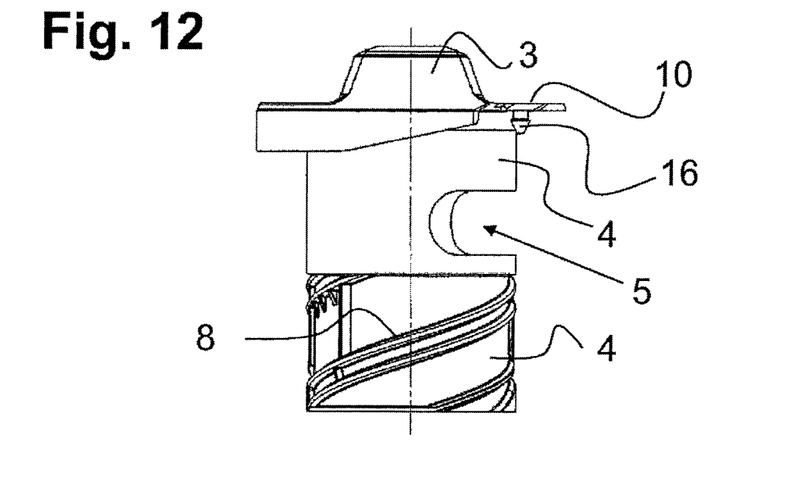
FIG. 12 shows the closure cap viewed from the side.
Figure 13:
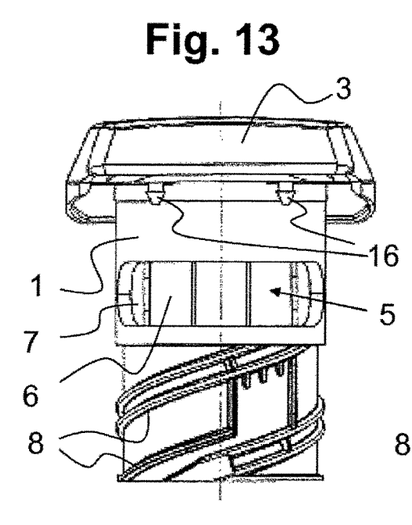
FIG. 13 shows the closure cap viewed from the front.
Figure 14:
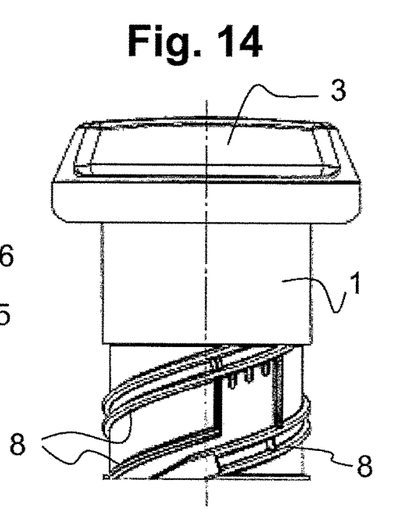
FIG. 14 shows the closure cap viewed from the rear.
Figure 15:
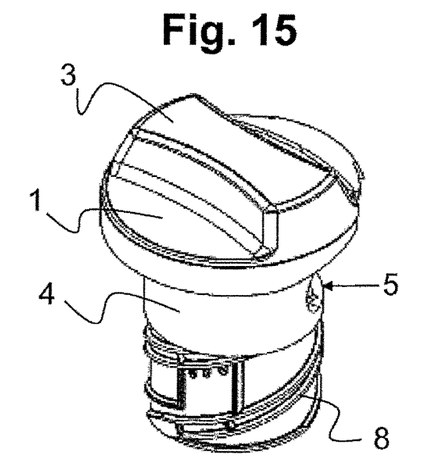
FIG. 15 shows the closure cover viewed from the rear and obliquely upwards.
Figure 16:
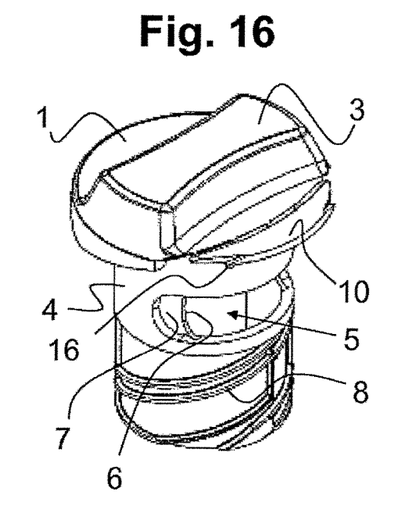
FIG. 16 shows the closure lid viewed from the front and obliquely upwards.
Figure 17:
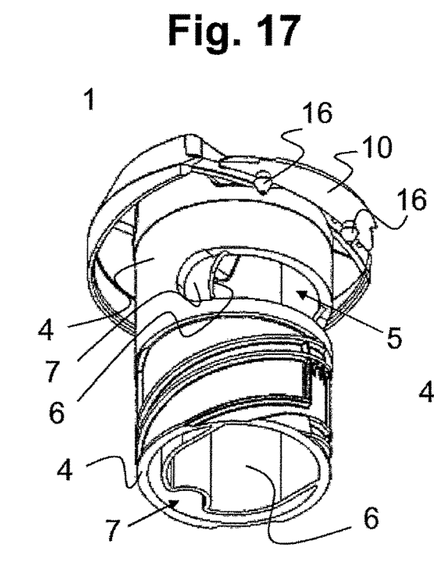
FIG. 17 shows the closure cap viewed from the front and obliquely downwards.
Figure 18:
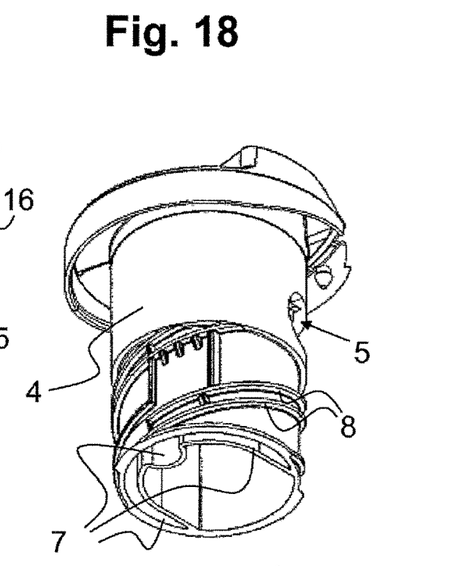
FIG. 18 shows the closure cap viewed from the rear and obliquely downwards.
Figure 19:
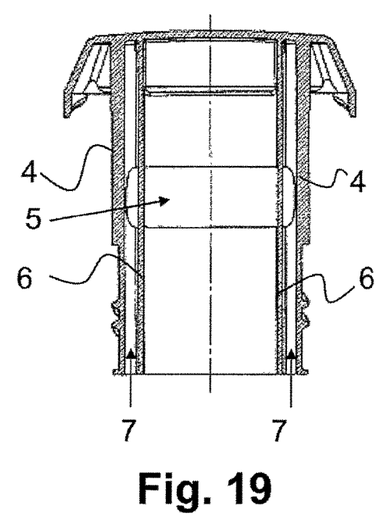
FIG. 19 shows the closure cap in a section along the axis of rotation and along the grip on its upper side.
Figure 20:
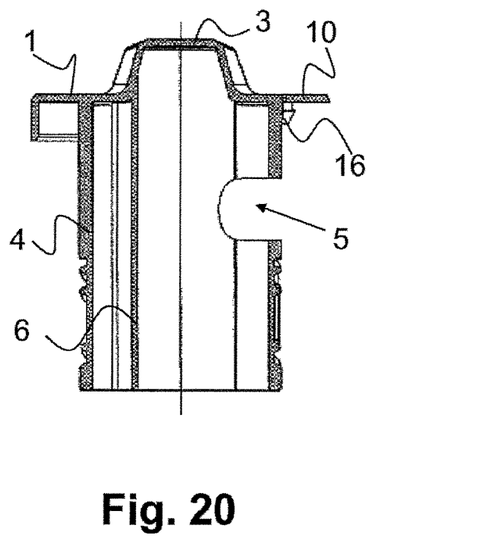
FIG. 20 shows the closure cap in a section along the axis of rotation and transversely to the grip on its upper side.

FIG. 10 to 20 all show the closure cap in different views, first viewed in FIG. 10 from above with an intact initial tamper-proof facility. The plate 10 is connected to the closure cap 1 via a number of material bridges 9 as defined breaking points. FIG. 11 shows the closure cap 1 viewed from below with an intact initial tamper-proof facility. Here may be seen the clamping cone 16 on the lower side of the plate 10, which is engaged in the bushes 19 during the course of the first assembly of the closure cap 1 and the neck attachment 2. In particular, the structure of the wall of the tube 4, which extends downwards in the interior of the closure cap 1, may be seen in this illustration. A further wall 6 is formed on the inner side of this tube 4 so that an intermediate space is formed between the outer side of this wall 6 and the inner wall of the tube 4 as a ventilation channel 7. This ventilation channel 7 opens at the lower end of the tube in the axial direction. Air flows through this air channel 7 from the outside into the interior of the canister during pouring and flows into the canister through the mouths at the lower end of the tube 4. At the upper end of the tube 4, the ventilation channel 7 only opens on the two sides of the window 5 in the tube 4, i.e. only in the upper region on the two sides of this window 5. FIG. 12 shows the closure cap 1 still viewed from the side with all the elements already described. Here may be seen the steep thread 8 on the outer side of the tube 4, as well as the window 5, which is cut out of the wall of the tube 4 and extends around almost 180° of the circumference of the tube. For pouring out liquid from the canister equipped with such a pouring closure, the latter may be pivoted into the pouring position by opening the closure cap 1 after the pouring cap has been opened as shown in FIG. 2. When the liquid subsequently flows out through the window 5 over the center of the drip lip 11, air simultaneously flows in from the outside through the openings on the two sides of the window 5 into the ventilation channel 7 for pressure equalization in the interior of the canister, and then flows through this space along the tube 4 until it finally flows into the canister through the U-shaped opening of the intermediate space or ventilation channel 7 visible in FIG. 11. Since the pouring tube 4 has a reduced cross-section compared to the neck of the canister, a uniform diluted jet is formed which does not surge because the air necessary for the pressure equalization in the canister can always flow downstream, irrespective of the position of the drip lip 11. Thus, it is possible to pour out over the center of the drip lip 11. On the other hand, it is also possible to pour over the drip lip 11 displaced by 90° on the circumference. This would be the case if the liquid were poured out via a side limit of the window 5. Then the air for the pressure equalization flows on the opposite side of the window 5 through the opening provided there into the ventilation channel 7 or intermediate space. Consequently, a sufficient pressure equalization in the canister is achieved in each pouring position. In this way, the jet is held stationary and uniform. This is necessary to ensure controlled pouring. Regardless of whether the canister is tilted more or less steeply, a controlled pouring jet is always produced. When the pouring stops, there is also no drop hanging on the outside of the drip lip 11. Rather, the pouring jet breaks off sharply, and any residual liquid on the drip lip 11 flows back into the canister due to capillary action.

Figure 21:
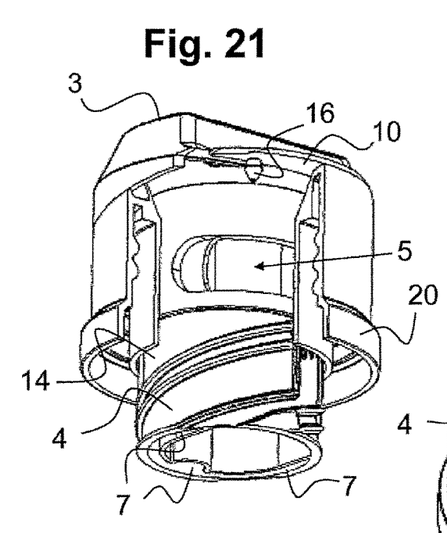
FIG. 21 shows the closure cap in a partial section which gives a view into the interior.
Figure 22:
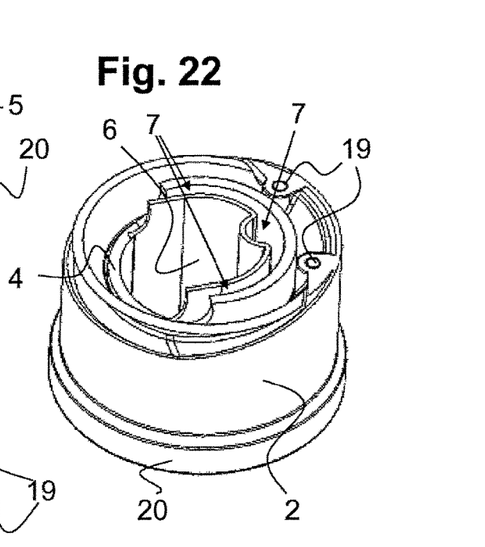
FIG. 22 shows the pouring closure cut open transversely along the drip lip.
Figure 23:
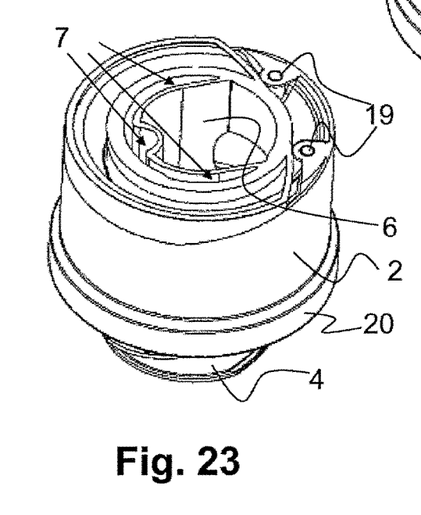
FIG. 23 shows the pouring closure cut open transversely along the drip lip, with the closure cap turned through 180°.

FIG. 13 to 20 illustrate this pouring closure comprising the closure cap 1 and neck attachment 2 with further drawings, wherein FIGS. 21 and 23 illustrate partial sections or sections through the assembled pouring closure, for a better understanding of the internal construction of the parts.

This pouring closure may be implemented in various ways. Instead of a threaded connection, the closure cap 1 may also be so designed such that it may be pulled out of the neck attachment 2 like a push-pull closure, and may easily engage both in the closed position as well as in the open position. To enable this, the neck attachment 2 forms a cap with latching means on its inner side, for snapping engagement in the latching means on a canister neck to be fitted with neck attachment 2. The latching means on the inner side of the cap consist of a groove extending along the circumferential line for snapping over a circumferential bead, or wherein an edge projecting outwards is formed at the canister neck mouth. Furthermore in this execution, at least one axial guide rib or guide groove is provided on the closure cap 1 on its downwardly-extending tube 4, wherein the guide groove may be brought into engagement with at least one guide groove or guide rib on the inner wall of the tube/channel 14 on the neck attachment 2. The tube/channel 14 or the tube 4 fitted into it on the closure cap 1 may be designed to be circular or oval or to have other cross-sectional shapes, while, in the case of a push-pull version, it is also not necessary that it is arranged concentrically around the closure cap and the neck attachment. It is important that the ventilation channel extends around at least 90°, but more preferably 180°, of the pouring tube or channel, wherein the channel is banana-shaped in cross-section. When the pouring channel is 180° enclosed, two suction openings are formed on the two sides of the window in the upper region thereof. Only with such a ventilation channel 7 surrounding the pouring channel by at least 90°, but preferably around 180°, may it be ensured that sufficient air flows into the canister in every pouring position in order to achieve constant pressure equalization. The latter is decisive in ensuring that the poured liquid jet does not surge but exits uniformly and equally with a controllable jet thickness.

It is apparent from the description and the accompanying figures that this pouring closure is suitable for all conceivable containers provided with a neck and which are tilted to pour liquid or a bulk material.

LIST OF REFERENCE NUMERALS

1 Closure cap
2 Neck attachment
3 Grip on the closure cap
4 Tube on the closure cap
5 Window in the tube 4
6 Internal wall in the tube 4
7 Ventilation channel, intermediate space
8 Steep thread on the tube 4
9 Material bridges as defined breaking points
10 Plate with material bridges 9
11 Drip lip 12 Taper under the drip lip
13 Shoulder under the drip lip
14 Channel in neck attachment
15 Thread on cap of the neck attachment
16 Clamping cone on the plate 10
17 Grip surface on the grip 3
18 Threaded guide on the inside of the channel 14
19 Snap-in holes
20 Security band under the neck attachment
21 Lower edge of the closure cap

The invention claimed is:

1. A pouring closure for the neck of a canister, container or tube, comprising a neck attachment (2) and an associated closure cap (1) as a jet former, wherein a tube (4) having a circumference and located on the closure cap (1) extends downward and sealingly into a tubular channel (14) arranged in the interior of the neck attachment (2) and which tube (4) comprises a window (5) as a pouring mouth, which window (5) extends at least around a part of the circumference of tube (4) and wherein the closure cap (1) is axially extendable within the neck attachment (2) until the window (5) lies above an upper edge of the neck attachment (2) whereby the window (5) serves as the pouring mouth and jet former, and the pouring closure is closed when the closure cap (1) is fully inserted down into the neck attachment (2) which causes the window (5) to seal against an inner wall of the tubular channel (14) wherein the window (5) in the tube (4) extends around a circumferential area of between at least 90° and 180° of the circumference of the tube (4), while the remainder of the circumference of tube (4) is double-walled, so that either in this remaining circumference of tube (4) or within or outside of channel (14), arranged coaxially or parallel beside channel (14), at least one air channel (7) is formed which opens outwards at a lower end of tube (4) and opens outwards laterally on a right side, or a left side, or both sides of window (5), so that a controlled multi-side pouring out of liquid and at the same time corresponding intake of air into the canister is possible over the entire circumference of window (5), that is over the left side of the window (5) or over the right side of the window (5) and over any section in between.

2. The pouring closure for the neck of a canister or container according to claim 1, characterized in that the at least one air channel (7) is formed in the remaining tube circumference of the tube (4), wherein the remaining tube circumference is double-walled apart from the window (5), and wherein the tube (4) forms a further tube wall (6) in its interior, wherein the intermediate space between the two tube's (4) walls opens outwards in the axial direction as a ventilation channel (7) at the lower end of the tube (4), and only opens outwards laterally on both sides in the upper region of the window (5), so that controlled multi-side pouring is possible.

3. The pouring closure for the neck of a canister or container according to claim 1, characterized in that the channel (14) on the neck attachment (2) on its upper end is forming an outer edge which forms a drip lip (11), wherein this outer edge forms a sharp radial projection, under which the neck attachment (2) is tapered (12) through a wall extending obliquely downwards, while a shoulder (13) is formed at the lower end of the taper (12).

4. The pouring closure for the neck of a canister or container according to claim 1, characterized in that the neck attachment (2) forms a cap with an internal thread (15) for attachment to the canister neck.

5. The pouring closure for the neck of a canister or container according to claim 1, characterized in that the neck attachment (2) forms a cap with a latching means on its inner side, for snapping engagement with the canister neck.

6. The pouring closure for the neck of a canister or container according to claim 5, characterized in that the latching means on the inner side of the cap consist of a groove extending along the circumferential line for snapping over a circumferential bead or edge projecting outward on the canister neck.

7. The pouring closure for the neck of a canister or container according to claim 1, further including a drip lip (11) on neck attachment (2), characterized in that the closure cap (1) has an external thread (8) on its downwardly-extending tube (4) that may be brought into engagement with at least two guide ribs (18) on the inner wall of the channel (14) at the neck attachment (2), so that the closure cap (1) may be rotated 180° from a sealing position to a pouring position, whereby a liquid jet is pourable through window (5) in tube (4) and above the drip lip (11) on the neck attachment (2).

8. The pouring closure for the neck of a canister or container according to claim 5, further including a drip lip (11) on neck attachment (2), characterized in that the closure cap (1) comprises an axial guide rib or a guide groove on tube (4), which may be brought into engagement with at least one matching guide groove or guide rib on the inner wall of the channel (14) of neck attachment (2), so that the closure cap may be brought into the pouring position by lifting it from a sealing or closed position to an open position in which a liquid jet may be poured through the window (5) in tube (4) over the drip lip (11), whereby pouring is enabled in all directions between the two sides of the pouring closure that are offset by 90°, wherein the pouring closure may engage with tube (4) in both the open and closed positions, in correspondence with the latching means on the tube (4) of the closure cap (1) and the channel (14) of the neck attachment (2).

9. Pouring closure for the neck of a canister or container according to claim 1, characterized in that the closure cap (1) comprises at least one downwardly-projecting clamping cone (16) on a breakable tamper-proof plate (10) in the region outside its downwardly extending tube (4), wherein the at least one clamping cone (16) may engage in the locked position of the closure cap (1) in a snap-in hole (19) serving as a detent hole on the neck attachment (2), wherein, following this clamping, the closure cap (1) may only be brought out of the closed position by the breaking of at least one material bridge (9) serving as a defined breaking point on the plate (10).

10. Pouring closure for the neck of a canister or container according to claim 1, characterized in that the closure cap (1) forms part of a circular disc which, viewed from above, with a separate banana-shaped part (10) of a circular disc attached via material bridges (9) to the other part of the circular disk of the closure cap (1) which adds the missing part to form a full circular disc when seen from above, while the separate part (10) remains as a tamper-proof facility attached to the neck attachment (2), while the circular disc viewed from above in the pouring position shows a missing segment, so that an opening for the pouring jet remains free in an overhead position.

11. Pouring closure for the neck of a canister or container according to claim 1, characterized in that the closure cap (1) has on its upper side a grip (3) extending diametrically over the upper side of the closure cap (1).

12. Pouring closure for the neck of a canister or container according to claim 1, characterized in that the neck attachment (2) forms a drip lip (11) projecting radially outwards along at least 180° of its circumference and which is offset with respect to its other radius, and that the region under this drip lip (11) at the neck attachment (2) is tapered over a height of 2 to 5 mm, while a shoulder (16) is formed at the lower end of the taper (12) for the exact acceptance of the correspondingly-shaped lower edge of the attachable closure cap (1).

\* \* \* \* \*